Dec. 12, 1961  A. T. NORTON, JR  3,013,157
SPOT-SIZE CAMERA
Filed Dec. 31, 1958

United States Patent Office 3,013,157
Patented Dec. 12, 1961

3,013,157
SPOT-SIZE CAMERA
Augustus T. Norton, Jr., Wilmington, Mass., assignor to High Voltage Engineering Corporation, Burlington, Mass., a corporation of Massachusetts
Filed Dec. 31, 1958, Ser. No. 784,202
8 Claims. (Cl. 250—105)

This invention relates to high-energy X-ray apparatus and in particular to a novel spot-size camera for use with a high-energy X-ray generator. High-energy X-rays are utilized in radiography and in medical therapy. In such a device electrons are accelerated to high energy and are permitted to bombard a target material of high atomic number such as tungsten or gold. The result of this bombardment is the production of X-rays at the target and the source of X-rays has an area corresponding to the area of bombardment by high energy electrons. For various reasons it may be desirable that this spot size or area of the origin of X-rays should be as small as possible, and in attaining this goal it becomes necessary to measure the actual size of the X-ray source (i.e., the spot size). In general this is done by means of film since, of course, X-rays are not visible. However, it is important that the impression made on the film by the X-rays originating from the spot be clearly differentiated from the effect on the film of other X-rays which may be in the vicinity of the target. As a result, elaborate devices have been utilized in order to determine the size of the X-ray source. In accordance with the invention a very simple method of determining this spot size is provided. In accordance with one embodiment of the invention a tightly strapped bundle of rods of some appropriate material such as steel are placed between the X-ray target and the film. In another embodiment of the invention the bundle of rods is replaced by a laminated stack of appropriate foils such as paperbacked lead foil. With the laminated foil it is necessary to take two pictures, the laminations being arranged for one picture perpendicular to their arrangement for the other picture. With the bundle of rods, one picture is sufficient.

The invention may best be understood from the following detailed description thereof having reference to the accompanying drawing in which.

Figure 1:
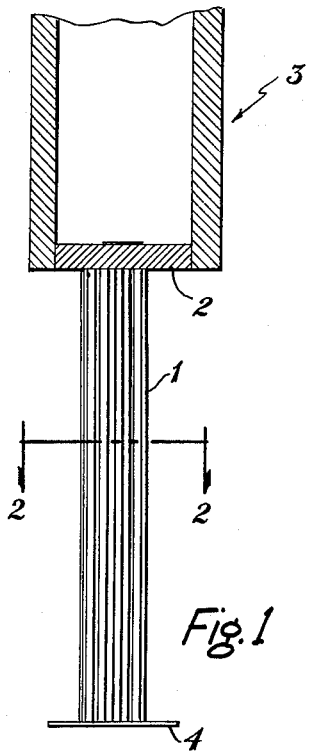
FIG. 1 illustrates one embodiment of the invention in which a bundle of rods is used.
Figure 2:
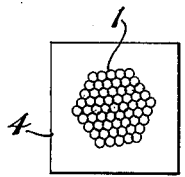
FIG. 2 is a view along the line 2—2 of FIG. 1.
Figure 3:
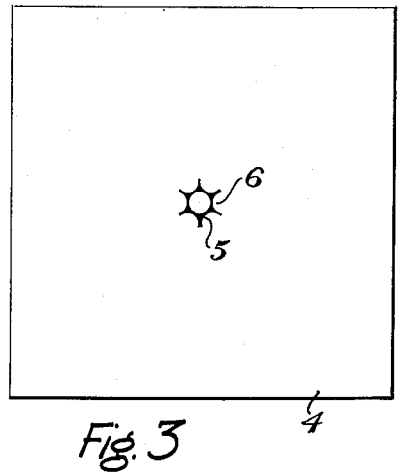
FIG. 3 illustrates a picture obtained with the apparatus of FIG. 1.

Referring to the drawing and first to FIGS. 1 and 2 thereof, a bundle of rods 1 is interposed between the X-ray target 2 of a high-energy X-ray generator 3 and the film 4 which is to record the spot size and which may comprise dental X-ray film, for example. The bundle of rods 1 is arranged so that the gaps between rods 1 form a passageway for X-rays traveling from the target 2 to the film 4. The length of the rods 1 must be sufficient for their filtering action to take effect. For highenergy X-rays this length should be more than one or two times the half-value layer in the steel, so that either the length of the rods must be increased or the exposure time decreased as the energy is increased. In operation of my invention I have used steel rods $\frac{1}{16}$-inch in diameter. Another suitable size would be $\frac{1}{32}$-inch in diameter. For X-rays produced by 2-mev. electrons the length of steel rods should be about 6 inches. As is clear from the view shown in FIG. 3, the arrangement of FIG. 1 produced a pattern on the film 4 in which the dark areas 5 represent X-rays traveling directly from the target 2 to the film 4 while the lighter areas 6 represent X-rays which have travelled through the steel rods 1 before reaching the film 4. As is apparent from the view of FIG. 3, the device shown in FIG. 1 gives the general outline of the spot size in one picture.

Figure 4:
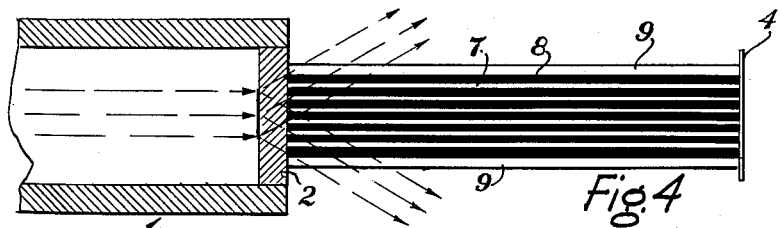
FIG. 4 illustrates another embodiment of the invention wherein a laminated stack of foils is used.
Figure 5:
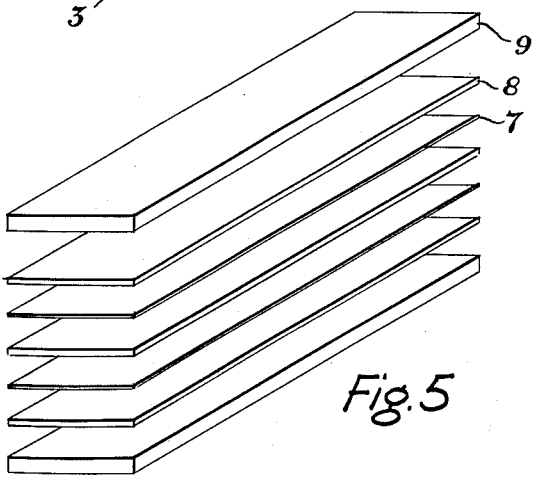
FIG. 5 is an exploded view of the stack of foils of FIG. 3.

Referring now to FIGS. 4 and 5 in an alternative embodiment of the invention the rods 1 of FIG. 1 are replaced by paper-backed lead foil. The paper 7 may be, for example, .003 inch thick while the lead 8 is .010 inch thick. This paper-backed lead foil 7, 8 may be cut in strips 6 inches long and 1 inch wide and stacked to a total thickness of one inch. One-eighth inch thick bars 9 of brass are required at the top and bottom of the stack to prevent flexing of the laminations and to assure that the sheets remain parallel. The assembly is bound tightly with Scotch masking tape (not shown). One end of the stack of foil 7, 8 is abutted against the target 2 and the film 4 is taped to the other end. A picture is taken and then a second picture is taken on the same film 4, but with the stack of foil 7, 8 (but not the film 4) rotated axially through ninety degrees. Exposure of 8 seconds for 2-mev. and 60 seconds for 1-mev. at 250 amps. have been used successfully. The result is shown in the view of FIG. 5 and indicates the width and length of the spot size.

Figure 6:
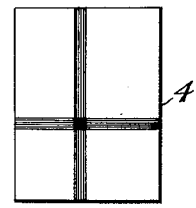
FIG. 6 illustrates the picture obtainable with the apparatus of FIG. 4.

The principle of operation of this camera is the collimation of the X-rays by alternate sheets of lead and paper, with only the parallel forward rays passing readily through the paper sheets. As only the slits covering the X-ray spot will pass parallel rays, an image appears on the film, equivalent in width to the spot (see FIG. 6). The number of parallel lines on the film determines the spot width. Example: A spot picture with three distinct lines would be interpreted as, $3 \times .013'' = .039''$ wide. After repeated tests in comparing this camera to a scanning camera, it was found that faint or less intense outer lines can be ignored in the width measurements. The ease of alignment and operation, the compactness, light weight and low cost of fabrication, along with reliability in spot size determination make this camera an ideal instrument for factory and field use. With respect to the laminated device shown in FIGS. 4 and 5, it is unsuitable to have the lead 8 thicker than .010 inch. If the lead is too thick, one misses part of the spot. On the other hand, if the lead is too thin, in relation to the thickness of the paper 7, one gets undercutting. That is to say, the film 4 underneath the lead 8 becomes exposed towards its edges. This tends to reduce the definition. If the paper 7 is too thin, it either takes too long to take an exposure or else there is only a very faint line. That is to say, the faintness of the line requires a longer exposure which in turn results in fogging of the film and lost definition. For readability the thickness of the paper 7 and the lead 8 should be such that the combined thickness of a layer of lead 8 and a layer of paper 7 is equal to about .010 inch. For example, .003 inch thickness for the paper and .007 inch for the lead would be suitable. Such an arrangement makes measurement easy since one frequently speaks in terms of millimeters, and one millimeter is equal to .039 inch or roughly .040 inch. With the above measurements four lines would represent 1 millimeter. About a 3-to-1 lead to paper ratio is a good figure and the lead should be between .005 inch and .010 inch thick.

With regard to the spot sizes to be measured, one-half a millimeter is a very small spot, and in general one can't measure below this. One millimeter or less is a very fine spot.

Having thus described the principles of the invention together with several illustrative embodiments thereof, it is to be understood that although specific terms are employed they are used in a generic and descriptive sense and not for purposes of limitation, the scope of the invention being set forth in the following claims.

I claim:

1. Apparatus for measuring the spot size of a high energy X-ray generator comprising, in combination with a high energy X-ray generator having an X-ray target, a film upon which the spot size is to be recorded, a collimator, means for supporting one end of said collimator in abutment against the exterior surface of said X-ray target, and means for supporting said film in abutment against the opposite end of said collimator, said collimator comprising at least two materials having different X-ray absorption characteristics the material which is the lesser absorber being arranged in volume segments bounded by straight, parallel lines extending the entire distance between the target and the film, at least one of the cross-sectional dimensions of said volume segments being small relative to the spot size to be measured and the length thereof being not less than approximately the half value layer of said X-rays in the material which is the greater absorber.

2. Apparatus for measuring the spot size of a high energy X-ray generator comprising, in combination with a high energy X-ray generator having an X-ray target, a film upon which the spot size is to be recorded, a collimator, means for supporting one end of said collimator in abutment against the exterior surface of said X-ray target, and means for supporting said film in abutment against the opposite end of said collimator, said collimator comprising a bundle or faggot of straight, parallel rods extending the entire distance between the target and the film, the cross sectional dimension of said rods being small with respect to the spot size to be measured and the length of said rods being not less than approximately the half value layer of said X-rays in said relatively high-atomic-numbered material.

3. Apparatus for measuring the spot size of a high energy X-ray generator comprising, in combination with a high energy X-ray generator having an X-ray target, a film upon which the spot size is to be recorded, a collimator, means for supporting one end of said collimator in abutment against the exterior surface of said X-ray target, and means for supporting said film in abutment against the opposite end of said collimator, said collimator comprising a laminated stack of alternating straight, parallel layers of relatively high-atomic-numbered material and relatively low-atomic-numbered material extending the entire distance between the target and the film, the width of said layers of relatively high-atomic-numbered material being small with respect to the spot size to be measured and the length thereof being not less than approximately the half value layer of said X-rays in said relatively high-atomic-numbered material.

4. Apparatus in accordance with claim 3 wherein the combined thickness of each pair of adjacent layers is approximately ten-thousandths of an inch.

5. Apparatus in accordance with claim 3 wherein the thicknesses of each layer of relatively high-atomic-numbered material is approximately thrice that of each layer of relatively low-atomic-numbered material.

6. Apparatus in accordance with claim 3 wherein the thickness of each layer of relatively high-atomic-number material is between five- and ten-thousandths of an inch.

7. Apparatus in accordance with claim 3 wherein the thickness of each layer of relatively high-atomic-numbered material is approximately seven-thousandths of an inch, and that of each layer of relatively low-atomic-numbered material is approximately three-thousands of an inch.

8. The method of measuring the spot size of a high energy X-ray generator, which method comprises producing an electron beam, directing said electron beam onto an X-ray target, rendering visible the intensity of the X-rays so produced over a certain area, and collimating the X-rays arriving at said area from said target by interposing therebetween at least two materials having different X-ray absorption characteristics, and, in so doing, arranging the material which is the lesser absorber in volume segments bounded by straight, parallel lines extending the entire distance between the target and the film, at least one of the cross sectional dimensions of said volume segments being small relative to the spot size to be measured and the length thereof being not less than approximately the half value layer of said X-rays in the material which is the greater absorber.

References Cited in the file of this patent

UNITED STATES PATENTS

| | | |
|---|---|---|
| 2,133,385 | Freeman | Oct. 18, 1938 |
| 2,143,799 | Schonander et al. | Jan. 10, 1939 |
| 2,157,491 | Lindstedt | May 9, 1939 |
| 2,449,066 | Friedman | Sept. 14, 1948 |
| 2,566,265 | Tuttle | Aug. 28, 1951 |
| 2,605,427 | Delhumeau | July 29, 1952 |
| 2,806,958 | Zunick | Sept. 17, 1957 |